(12) United States Patent
Lee

(10) Patent No.: US 12,231,970 B2
(45) Date of Patent: Feb. 18, 2025

(54) SYSTEMS AND METHODS FOR DETERMINING A HANDOVER TIME PERIOD BASED ON MOBILITY PREDICTION

(71) Applicant: Verizon Patent and Licensing Inc., Basking Ridge, NJ (US)

(72) Inventor: Jay J. Lee, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 443 days.

(21) Appl. No.: 17/647,874

(22) Filed: Jan. 13, 2022

(65) Prior Publication Data

US 2023/0224790 A1    Jul. 13, 2023

(51) Int. Cl.
  *H04W 36/00* (2009.01)
  *H04W 36/30* (2009.01)
  *H04W 36/32* (2009.01)

(52) U.S. Cl.
  CPC ....... *H04W 36/0072* (2013.01); *H04W 36/30* (2013.01); *H04W 36/322* (2023.05)

(58) Field of Classification Search
  CPC . H04W 36/32; H04W 36/0072; H04W 36/30; H04W 36/00837; H04W 64/006
  See application file for complete search history.

(56) References Cited

U.S. PATENT DOCUMENTS 9,622,124 B2 *   4/2017   Hamilton .......... H04W 36/0061

FOREIGN PATENT DOCUMENTS

KR        20140103139 A *  8/2014

* cited by examiner

*Primary Examiner* — Chi H Pham
*Assistant Examiner* — Samuel Dilan Rutnam

(57) ABSTRACT

A device may receive geolocation data associated with a user device in a first cell region, and may determine a location of the user device. The device may determine whether the user device is located in an overlapping region or a non-overlapping region between the first cell region and a second cell region, and may calculate a velocity of the user device. The device may estimate a trajectory of the user device, and may calculate a first distance associated with the user device entering the overlapping region. The device may calculate a second distance associated with the user device exiting the overlapping region, and may determine a first time period to travel the first distance. The device may determine a second time period to travel the second distance, and may determine a handover time period based on the first time period and the second time period.

20 Claims, 13 Drawing Sheets

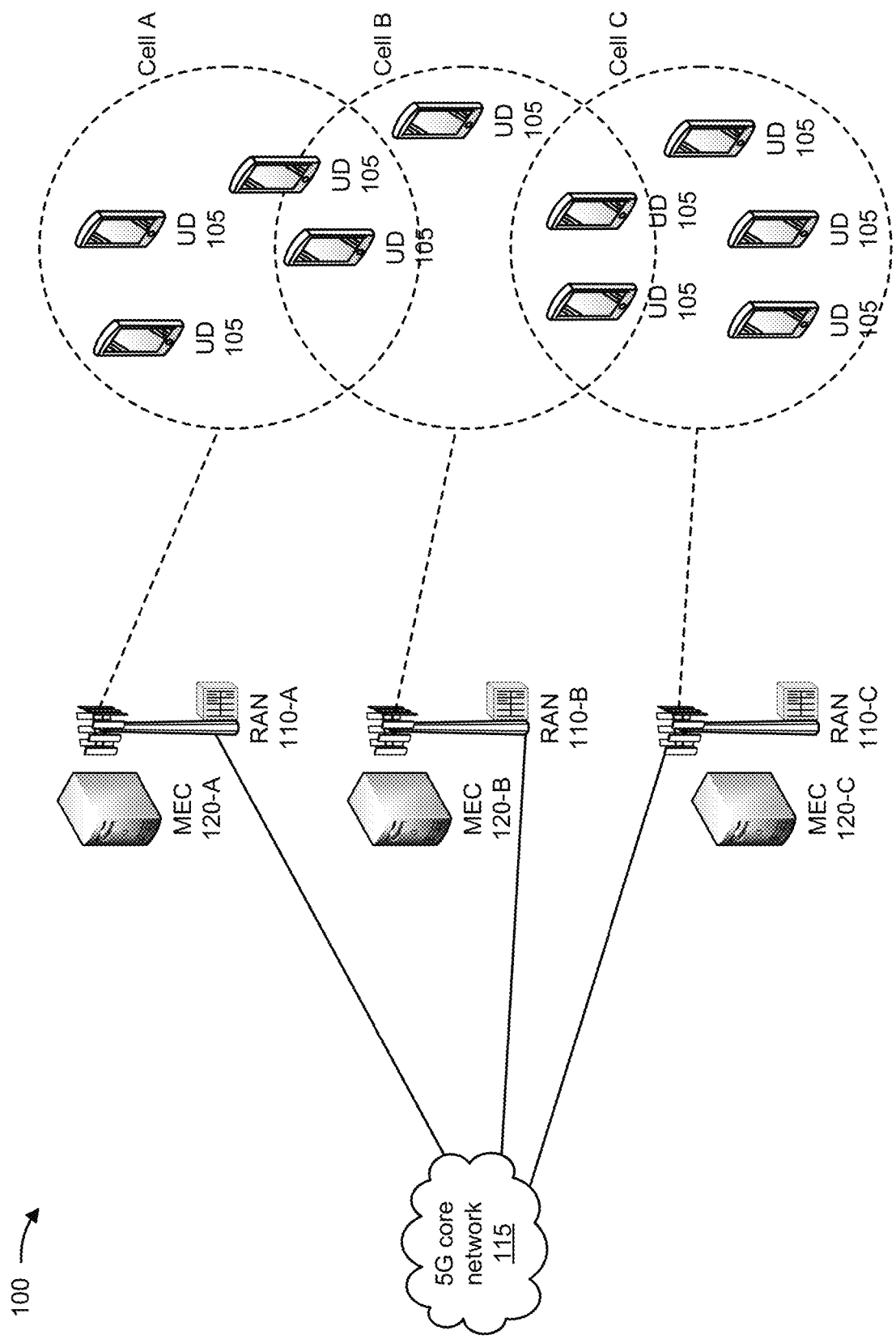

SYSTEMS AND METHODS FOR DETERMINING A HANDOVER TIME PERIOD BASED ON MOBILITY PREDICTION

BACKGROUND

A handover or a handoff of a user device (e.g., a mobile terminal or a user equipment (UE)) is a process in mobile communications in which a connected cellular call or a data session is transferred from one base station to another base station without the cellular call or the data session getting disconnected.

BRIEF DESCRIPTION OF THE DRAWINGS

FIGS. 1A-1J are diagrams of an example associated with determining a handover time period based on mobility prediction.

DETAILED DESCRIPTION OF EXAMPLE EMBODIMENTS

Figure 1B:
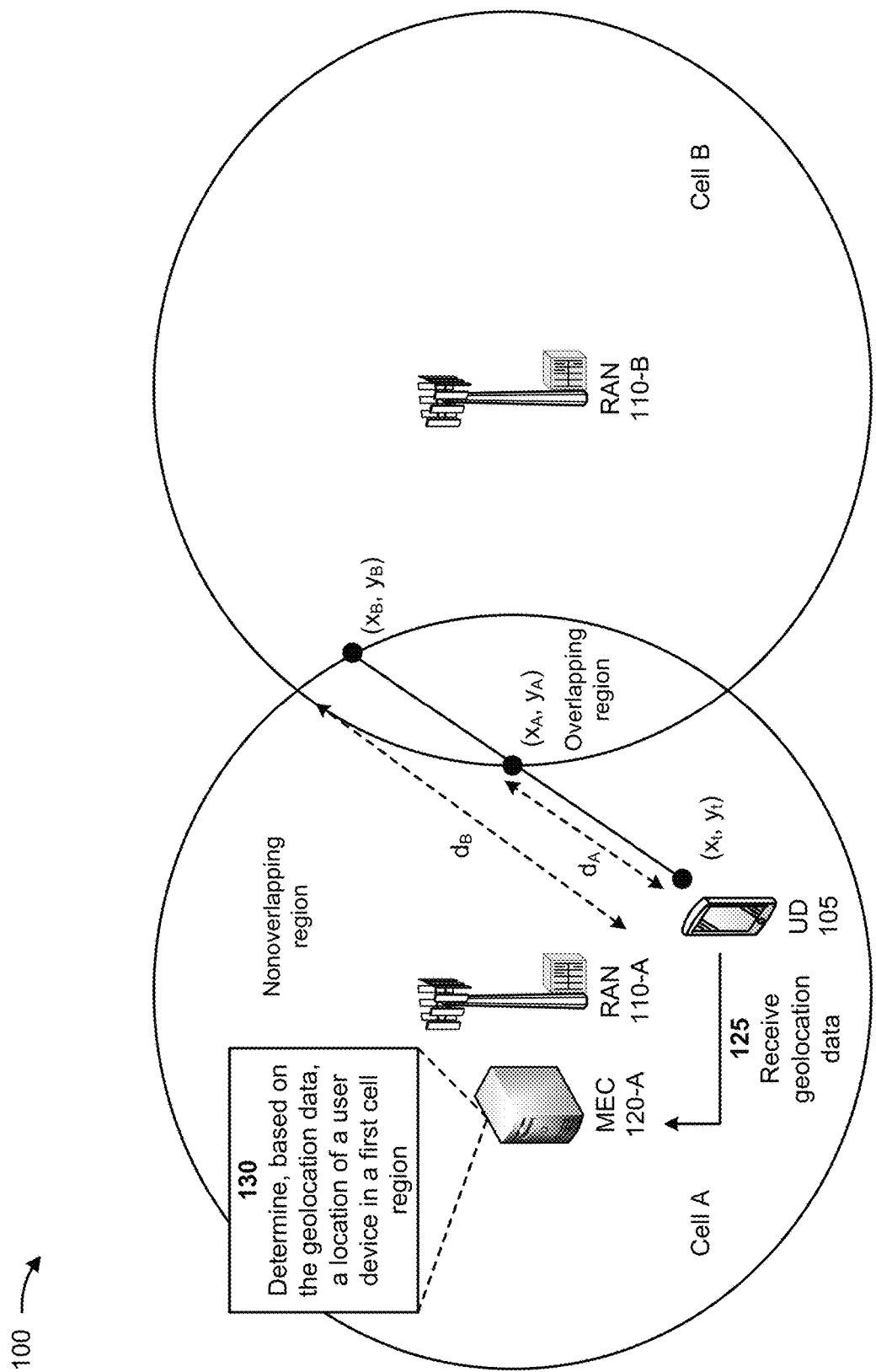

The following detailed description of example implementations refers to the accompanying drawings. The same reference numbers in different drawings may identify the same or similar elements.

Mobility of a user device in a connected mode (e.g., when the user device is active) is controlled by a mobile communication network and is assisted by the user device. In a handover, assisted by the user device and controlled by a network, the user device transmits measurement reports. The measurement reports may indicate that a link to a serving base station is degraded and/or that a link to neighboring base station in a same frequency is getting stronger than the serving base station. Based on such measurement reports, the network may handover a connection of the user device from the serving (or source) base station to the neighbor (or target) base station, so that the user device may continue a call or a data session, receive better radio conditions, and receive a better user experience. After successful completion of the handover, the serving base station may release any resources allocated to the user device.

While such a handover works for certain mobile services (e.g., voice services), the handover faces challenging issues for broadband data services that require large quantities of radio resources. For example, the target base station may not include enough radio resources to support a user device. When an abrupt handover of a resource demanding user device from the source base station to the target base station is requested, the user device may experience poor service and/or service disconnections. As cellular networks evolve from 4G to 5G and future generations, this issue has become more problematic as new applications in 5G and future generations require large quantities of radio resources and ultra-low latency.

Thus, current handover configurations consume computing resources (e.g., processing resources, memory resources, communication resources, and/or the like), networking resources, and/or other resources associated with failing to handover a user device from a source base station to a target base station, providing poor services to a user device handed over to a target base station not equipped with sufficient resources to serve the user device, losing a connection with a user device due to failing to handover the user device from a source base station to target base station, and/or the like.

Some implementations described herein provide a network device (e.g., a multi-access edge computing (MEC) device) that determines a handover time period based on a mobility prediction. For example, the MEC device may receive geolocation data associated with a user device in a first cell region associated with the MEC device, and may determine, based on the geolocation data, a location of the user device in the first cell region. The MEC device may determine, based on the location, whether the user device is located in an overlapping region between the first cell region and a second cell region or located in a non-overlapping region between the first cell region and the second cell region, and may calculate a velocity of the user device based on the geolocation data. The MEC device may estimate a trajectory of the user device based on the velocity of the user device, and may calculate, based on the user device being located in the non-overlapping region and based on the trajectory, a first distance between the location and a first location associated with the user device entering the overlapping region. The MEC device may calculate, based on the user device being located in the non-overlapping region and based on the trajectory, a second distance between the location and a second location associated with the user device exiting the overlapping region, and may determine, based on the velocity of the user device, a first time period for the user device to travel the first distance. The MEC device may determine, based on the velocity of the user device, a second time period for the user device to travel the second distance, and may determine a handover time period for the user device based on the first time period and the second time period. The MEC device may cause the user device to be handed over from the first cell region to the second cell region during the handover time period.

In this way, the MEC device determines a handover time period based on a mobility prediction. The handover time period provides a key enhancement in setting priority levels of handover for user devices. Without the handover time period, a handover between a source base station and a target base station is based on a first come, first serve basis or on quality of service (QoS)/class of service (CoS) levels of user devices (e.g., high, medium, or low classes), and this can cause unnecessary poor services, service disconnections, and inefficient use of radio resources. With the handover time period, however, handovers may be managed in a more efficient manner by setting handover priority levels based on a quantity of variables, such as handover time periods of user devices, QoS levels of user devices, resource requirements of user devices, available resources in a radio access network (RAN), a channel quality indicator (CQI), and/or the like. For example, if a high class user device has a handover time period of 600 seconds with large resource requirement, and a medium user device has a handover time period of 5 seconds with small resource requirement, the medium class user device may be served earlier than the high class user device, when available resources are limited, since such a decision will not impact quality of experiences of high class users or user devices.

In another example, the MEC device may determine a time period that a handover is to take place when the user device moves from a serving (or source) cell to a neighboring (or target) cell. The MEC device may determine the handover time period based on a mobility prediction of the user device with a machine learning model. Shifting handover time determination to the MEC device helps reduce congestion, decrease latency, and enhance a quality of experience (QoE) for end users. Thus, the MEC device may conserve computing resources, networking resources, and/or other resources that would have otherwise been consumed by failing to handover a user device from a source base station to a target base station, providing poor services to a user device handed over to a target base station not equipped with sufficient resources to serve the user device, losing a connection with a user device due to failing to handover the user device from a source base station to a target base station, and/or the like.

FIGS. 1A-1J are diagrams of an example 100 associated with determining a handover time period based on mobility prediction. As shown in FIGS. 1A-1J, example 100 includes user devices 105, radio access networks (RANs) 110, a core network 115 (e.g., a fifth-generation (5G) core network), and MEC devices 120. Further details of the user devices (UDs) 105, the RANs 110, the core network 115, and the MEC devices 120 are provided elsewhere herein.

As shown in FIG. 1A, a first RAN 110-A, a second RAN 110-B, and third RAN 110-C may be connected to the core network. The first RAN 110-A may be associated with a first MEC device 120-A, the second RAN 110-B may be associated with a second MEC device 120-B, and the third RAN 110-C may be associated with a third MEC device 120-C. The first RAN 110-A may generate a first cell that provides a first cell region (e.g., Cell A) for one or more user devices 105. The second RAN 110-B may generate a second cell that provides a second cell region (e.g., Cell B) for one or more user devices 105. The third RAN 110-C may generate a third cell that provides a third cell region (e.g., Cell C) for one or more user devices 105. The second cell region may include an overlapping region with the first cell region and the third cell region. The user devices 105 and the core network 115 may communicate via the RANs 110. The MEC devices 120 may control one or more operations of corresponding RANs 110. For example, the MEC devices 120 may control handovers of user devices 105 from one RAN 110 to another RAN 110 (e.g., within the overlapping regions or as user devices 105 approach the overlapping regions).

Although the core network 115 is depicted as a 5G core network, implementations described herein may be utilized with third-generation (3G) core networks, fourth-generation (4G) core networks, and future core networks. The MEC devices 120 extend capabilities of cloud computing by bringing such capabilities to an edge of a network. Whereas traditional cloud computing occurs on remote servers that are situated far from the user devices 105 and applications, the MEC devices 120 enable processes to take place closer to the user devices 105 and applications (e.g., in the RANs 110, mobile core networks, such user plane functions, central offices, and other aggregation points in the network). The load of cloud computing is shifted to individual local MEC devices 120, which reduces network congestion, decreases network latency, and enhances a quality of experience (QoE) for end users.

In some implementations, the MEC devices 120 may be associated with a cloud computing environment that provides data storage and data analytics for the MEC devices 120. The MEC devices 120 may be distributed locally or regionally so that each of the MEC devices 120 may provide local data storage and data analytics for associated user devices 105. Each of the MEC devices 120 may be co-located with a corresponding one of the RANs for more efficient processing. However, in some implementations, the MEC devices 120 may be located in a cloud computing environment (e.g., a cloud RAN (CRAN)), the core network 115 (e.g., in a UPF), a central office, and/or other network aggregation points.

As shown in FIG. 1B, a user device 105 may be located within the first cell region (e.g., Cell A) associated with the first RAN 110-A and the first MEC device 120-A. As further shown, the first cell region may include a nonoverlapping region with the second cell region (e.g., Cell B) associated with the second RAN 110-B, and may include an overlapping region with the second cell region. The user device 105 may be located within the nonoverlapping region or within the overlapping region and may be moving toward the second cell region and the second RAN 110-B. The user device 105 may be moving away from the first cell region and the first RAN 110-A.

As further shown in FIG. 1B, and by reference number 125, the first MEC device 120-A may receive geolocation data associated with the user device 105 in the first cell region (e.g., Cell A) associated with the first RAN 110-A. For example, the first RAN 110-A may receive the geolocation data associated with the user device 105, and may provide the geolocation data to the first MEC device 120-A. The first MEC device 120-A may receive the geolocation data from the first RAN 110-A. The geolocation data may include a global navigation satellite system (GNSS) location (e.g., a latitude and a longitude, an x-coordinate and a y-coordinate, and/or the like) of the user device 105 in the first cell region. In some implementations, the user device 105 may utilize a sensor (e.g., a GNSS device) to obtain, from a set of satellites, data indicating satellite coordinates for the user device 105. Each satellite, of the set of satellites, may send a respective set of satellite coordinates for the user device 105. The user device 105 may combine the multiple sets of satellite coordinates from the set of satellites to determine the GNSS location of the user device 105. The user device 105 may provide the geolocation data (e.g., the GNSS location) to the first RAN 110-A and the first RAN 110-A may provide the geolocation data to the first MEC device 120-A.

Alternatively, or additionally, the user device 105 may provide the multiple sets of satellite coordinates to the first RAN 110-A, and the first RAN 110-A may combine the multiple sets of satellite coordinates to determine the geolocation data (e.g., the GNSS location of the user device 105). In some implementations, the first RAN 110-A may determine the geolocation data based on a strength and a direction of a signal received from the user device 105. In some implementations, the first RAN 110-A may provide, to the first MEC device 120-A, the multiple sets of satellite coordinates and/or the strength and the direction of the signal received from the user device 105. In such implementations, the first MEC device 120-A may determine the geolocation data (e.g., the GNSS location of the user device 105) based on the multiple sets of satellite coordinates and/or the strength and the direction of the signal received from the user device 105.

As further shown in FIG. 1B, and by reference number 130, the first MEC device 120-A may determine, based on the geolocation data, a location of the user device 105 in the first cell region. For example, the first MEC device 120-A may analyze the geolocation data to determine a GNSS location of the user device 105 at a current time (t). In some implementations, the first MEC device 120-A may determine that the user device 105 is located at a GNSS location (e.g., $x_t$, $y_t$) based on analyzing the geolocation data. In some implementations, the first MEC device 120-A may calculate the GNSS location (e.g., $x_t$, $y_t$) of the user device 105 based on the multiple sets of satellite coordinates and/or the strength and the direction of the signal received from the user device 105.

Figure 1C:
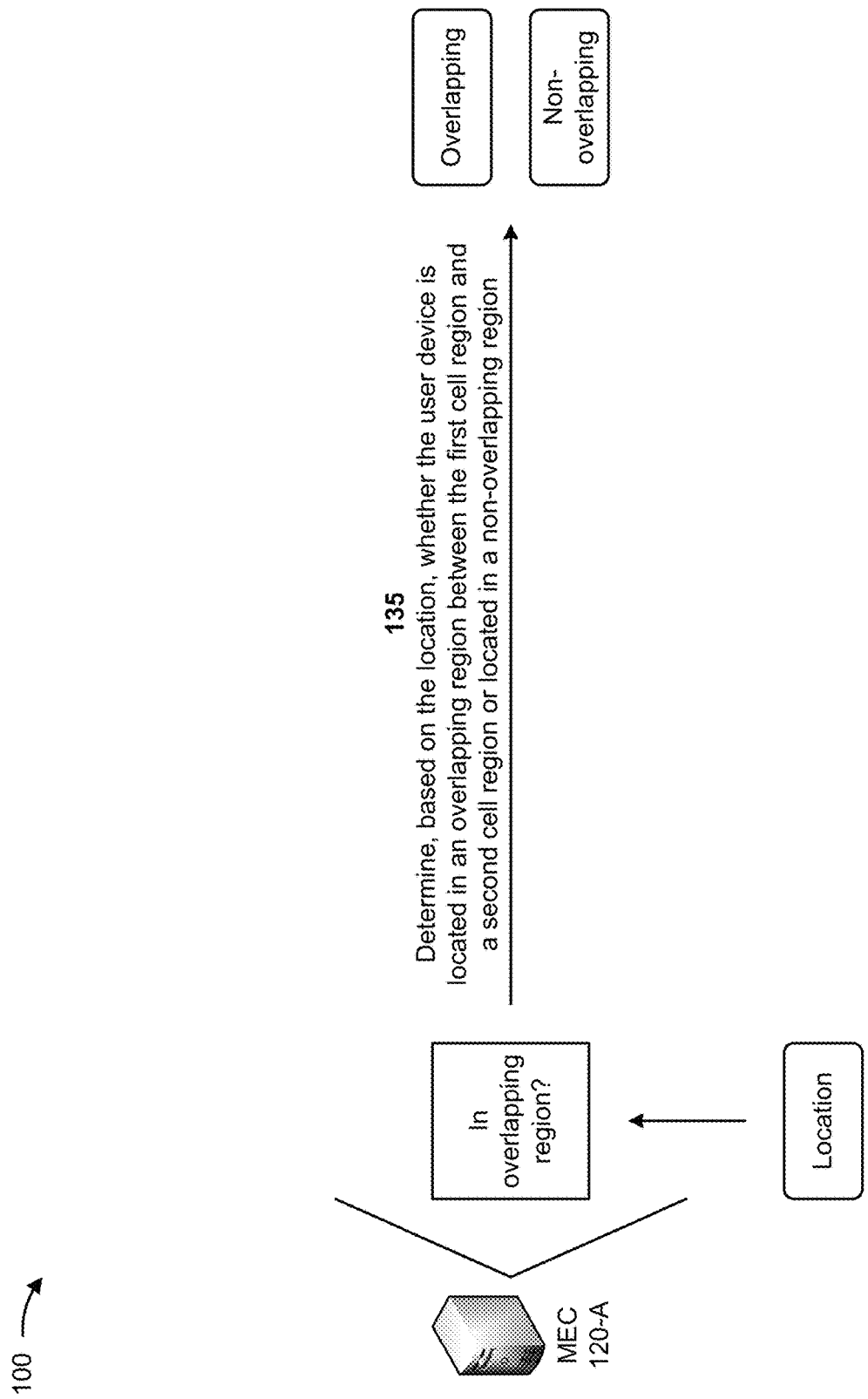

As shown in FIG. 1C, and by reference number 135, the first MEC device 120-A may determine, based on the location, whether the user device 105 is located in the overlapping region between the first cell region and the second cell region or located in the non-overlapping region. For example, the first MEC device 120-A may receive, from the first RAN 110-A, a first set of coordinates defining the overlapping region and a second set of coordinates defining the nonoverlapping region. The first MEC device 120-A may determine that the user device 105 is located in the overlapping region when the location of the user device 105 is located within the first set of coordinates defining the overlapping region. The first MEC device 120-A may determine that the user device 105 is located in the nonoverlapping region when the location of the user device 105 is located within the second set of coordinates defining the nonoverlapping region.

FIGS. 1D-1G depict processes utilized by the MEC device 120-A to calculate a handover time period for the user device 105, when the user device 105 is initially located in the nonoverlapping region. When the user device 105 is initially located in the nonoverlapping region, the handover time period may be calculated based on a time difference between a time when the user device 105 enters the second cell region and a time when the user device 105 leaves the first cell region. FIGS. 1D, 1E, 1H, and 1I depict processes utilized by the MEC device 120-A to calculate a handover time period for the user device 105, when the user device 105 is initially located in the overlapping region.

Figure 1D:
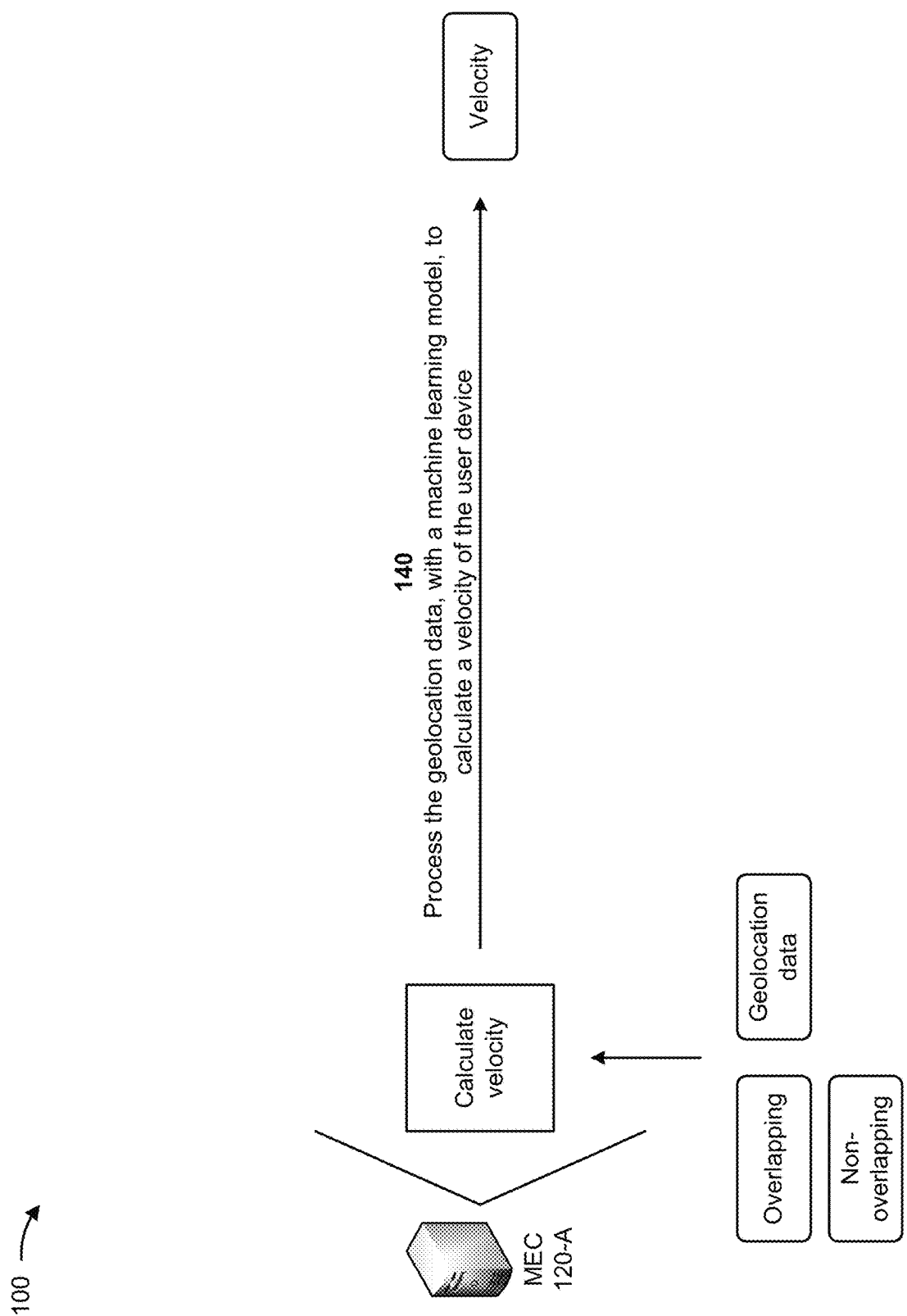

As shown in FIG. 1D, and by reference number 140, the first MEC device 120-A may process the geolocation data, with a machine learning model, to calculate a velocity of the user device 105. For example, the geolocation data may include data identifying movement of the user device 105 over time (e.g., a first set of coordinates at a first time, a second set of coordinates at a second time, and/or the like). The first MEC device 120-A may calculate the velocity the user device 105 based on the movement of the user device 105 over time. For example, the first MEC device 120-A may calculate a first difference between the first set of coordinates and the second set of coordinates, and may calculate a second difference between the first time and the second time. The first MEC device 120-A may divide the first difference by the second difference to determine the velocity of the user device 105.

In some implementations, the first MEC device 120-A may process the geolocation data, with the machine learning model, to calculate the velocity of the user device 105. The machine learning model may include a clustering model that groups similar information together using topic modelling techniques. The first MEC device 120-A may train the clustering model with historical data to enable the clustering model to calculate the velocity of the user device 105. In some implementations, the first MEC device 120-A may separate the historical data into a training set, a validation set, a test set, and/or the like. The training set may be utilized to train the clustering model. The validation set may be utilized to validate results of the trained clustering model. The test set may be utilized to test operation of the trained clustering model.

In some implementations, the first MEC device 120-A may train the clustering model using, for example, an unsupervised training procedure and based on the historical data. For example, the first MEC device 120-A may perform dimensionality reduction to reduce the historical data to a minimum feature set, thereby reducing resources (e.g., processing resources, memory resources, and/or the like) to train the clustering model, and may apply a classification technique to the minimum feature set. In some implementations, rather than training the clustering model, the first MEC device 120-A may obtain the trained clustering model from another system or device that trained the clustering model to generate the trained clustering model. In this case, the first MEC device 120-A may provide the other system or device with the historical data for use in training the clustering model, and may provide the other system or device with updated historical data to retrain the clustering model in order to update the trained clustering model.

Figure 1E:
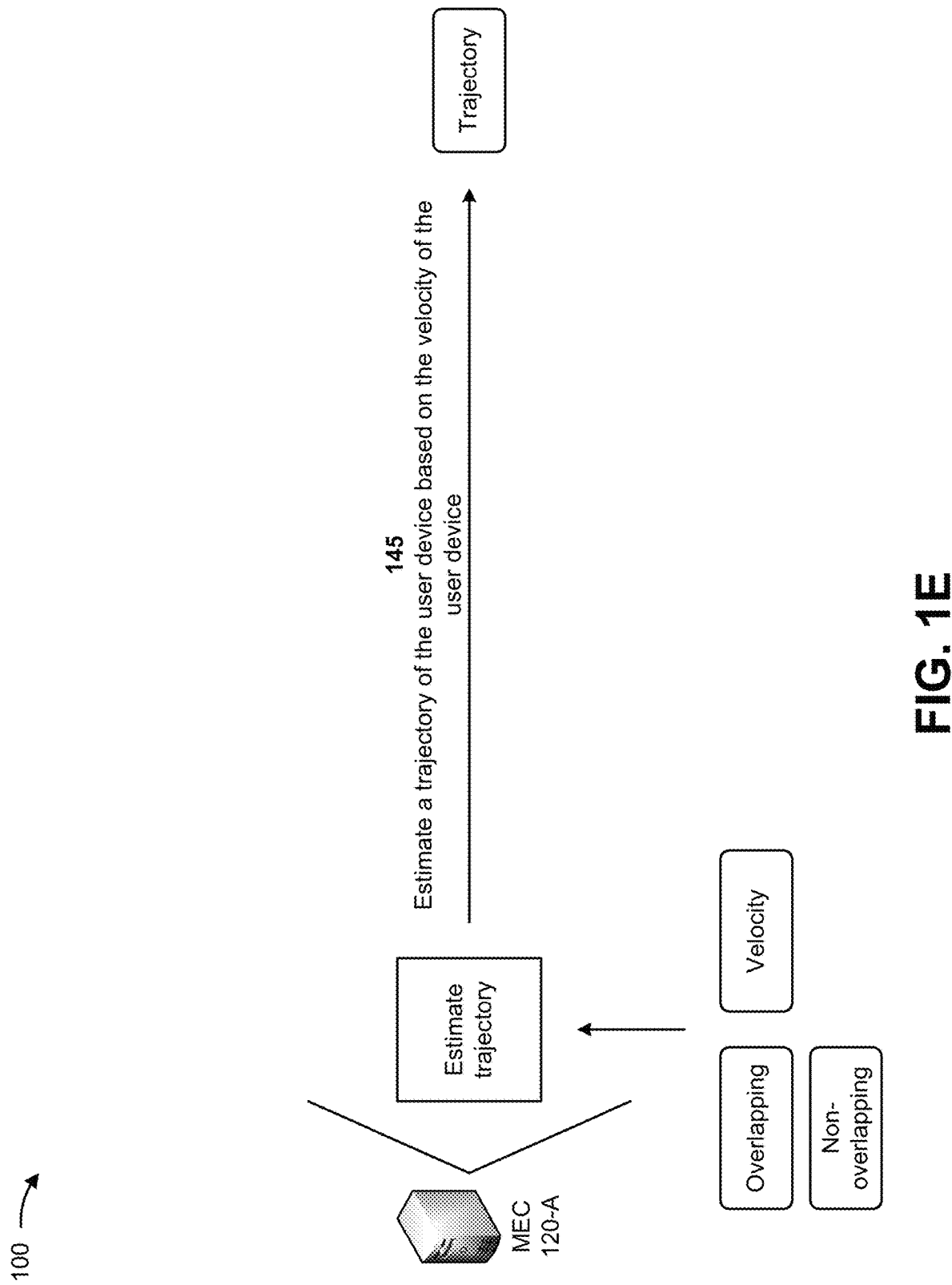

As shown in FIG. 1E, and by reference number 145, the first MEC device 120-A may estimate a trajectory of the user device 105 based on the velocity of the user device 105. For example, the velocity of the user device 105 may include a magnitude (e.g., a speed) of the user device 105 and a direction of the user device 105. The first MEC device 120-A may utilize the direction of the user device 105 as an estimate for the trajectory of the user device 105. As shown in FIG. 1B, the velocity of the user device 105 may indicate that the user device 105 is traveling along a trajectory defined by the solid line. The solid line may be generated based on the location (e.g., $x_t$, $y_t$), a first location (e.g., $x_A$, $y_A$) associated with the user device 105 entering the overlapping region, and a second location (e.g., $x_B$, $y_B$) associated with the user device 105 exiting the overlapping region. The first MEC device 120-A may utilize the solid line as the estimate of the trajectory of the user device 105.

Figure 1F:
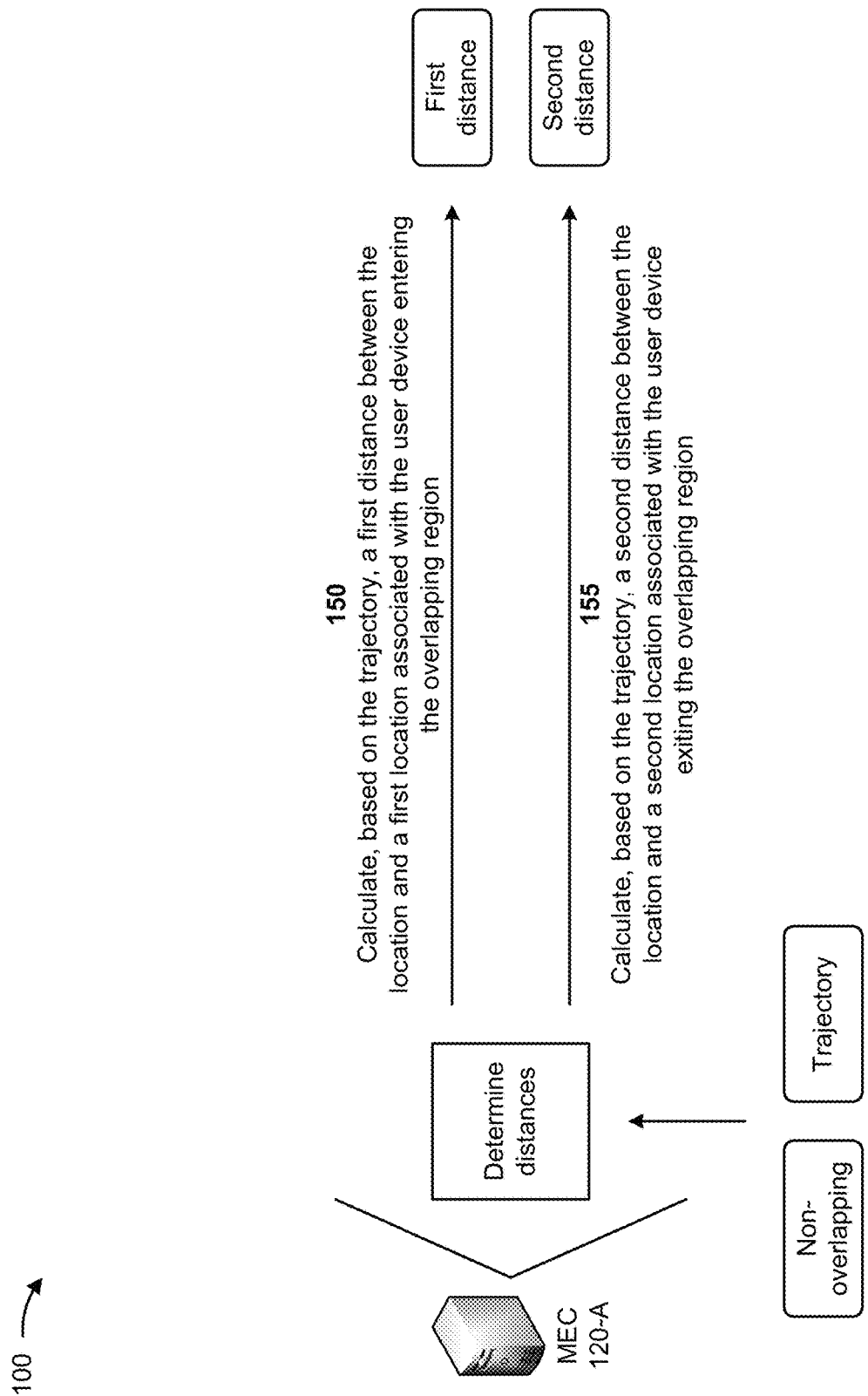

As shown in FIG. 1F, and by reference number 150, the first MEC device 120-A may calculate, based on the trajectory, a first distance between the location and the first location associated with the user device 105 entering the overlapping region. For example, the first MEC device 120-A may identify the second RAN 110-B based on the trajectory of the user device 105. Returning to FIG. 1B, the first MEC device 120-A may calculate the first distance (e.g., $d_A$) between the location (e.g., $x_t$, $y_t$) and the first location (e.g., $x_A$, $y_A$) associated with the user device 105 entering the overlapping region. For example, the first MEC device 120-A may calculate an x-distance between $x_t$ and $x_A$, and may calculate a y-distance between $y_t$ and $y_A$. The first MEC device 120-A may calculate the first distance (e.g., $d_A$) based on the x-distance, the y-distance, and the Pythagorean theorem. At the first location (e.g., $x_A$, $y_A$), the user device 105 may begin detecting a signal from the second RAN 110-B and may be entering into the second cell region.

As further shown in FIG. 1F, and by reference number 155, the first MEC device 120-A may calculate, based on the trajectory, a second distance between the location and the second location associated with the user device 105 exiting the overlapping region. For example, returning to FIG. 1B, the first MEC device 120-A may calculate the second distance (e.g., $d_B$) between the location (e.g., $x_t$, $y_t$) and the second location (e.g., $x_B$, $y_B$) associated with the user device 105 exiting the overlapping region. For example, the first MEC device 120-A may calculate an x-distance between $x_t$ and $x_B$, and may calculate a y-distance between $y_t$ and $y_B$. The first MEC device 120-A may calculate the second distance (e.g., $d_B$) based on the x-distance, the y-distance, and the Pythagorean theorem. At the second location (e.g., $x_B$, $y_B$), the user device 105 may completely lose a signal from the first RAN 110-A and may be completely exiting the first cell region.

Figure 1G:
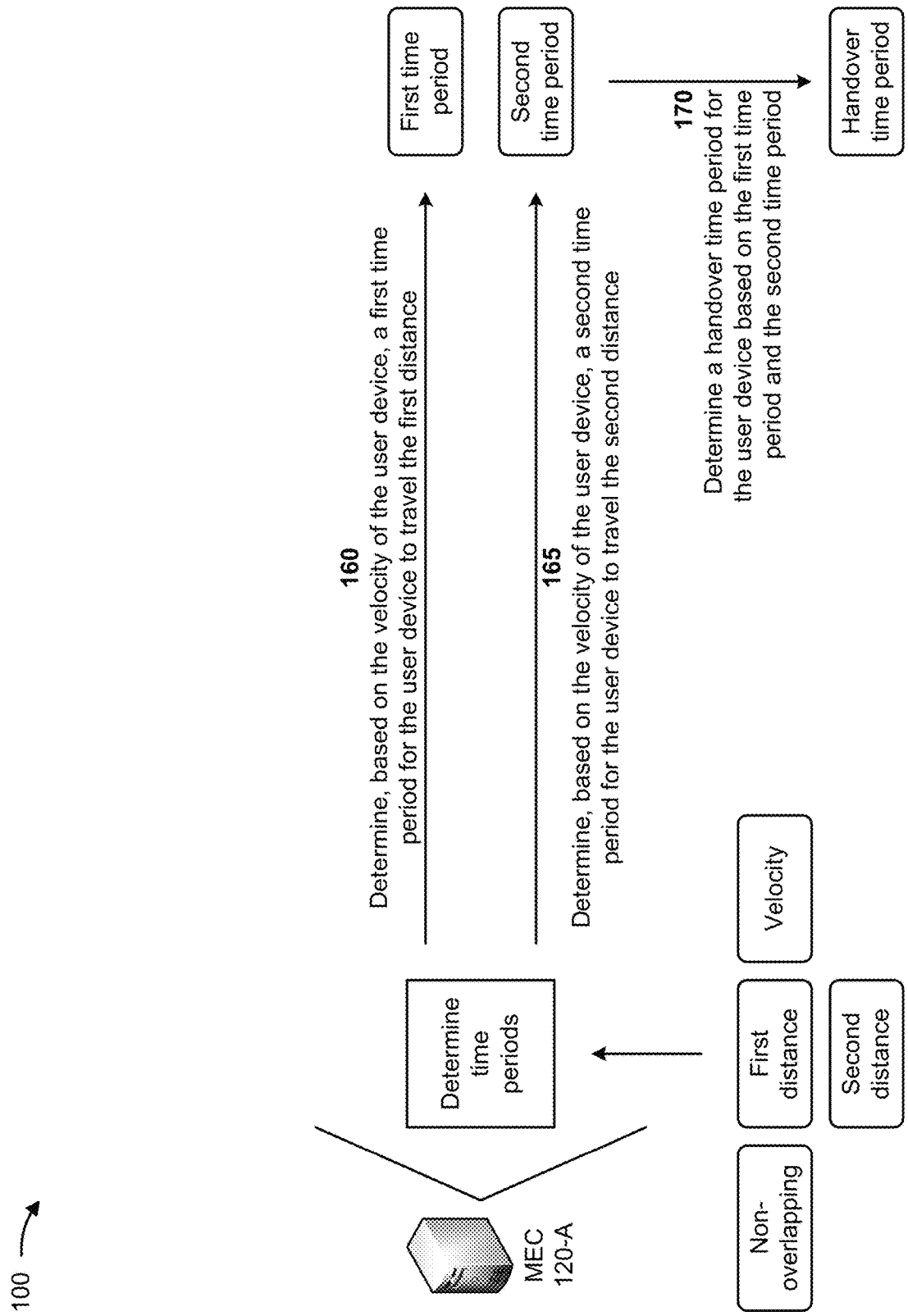

As shown in FIG. 1G, and by reference number 160, the first MEC device 120-A may determine, based on the velocity of the user device 105, a first time period for the user device 105 to travel the first distance. For example, the first MEC device 120-A may determine the first time period (e.g., $T_A$) for the user device 105 to travel the first distance (e.g., $d_A$) by dividing the first distance by the velocity (e.g., v) of the user device 105, as follows:

$$T_A = \frac{d_A}{v}.$$

As further shown in FIG. 1G, and by reference number 165, the first MEC device 120-A may determine, based on the velocity of the user device 105, a second time period for the user device 105 to travel the second distance. For example, the first MEC device 120-A may determine the second time period (e.g., $T_B$) for the user device 105 to travel the second distance (e.g., $d_B$) by dividing the second distance by the velocity (e.g., v) of the user device 105, as follows:

$$T_B = \frac{d_B}{v}.$$

As further shown in FIG. 1G, and by reference number 170, the first MEC device 120-A may determine a handover time period for the user device 105 based on the first time period and the second time period. For example, the first MEC device 120-A may determine a handover time period (e.g., HTP) for the user device 105 (e.g., currently in the nonoverlapping region) by subtracting the first time period (e.g., $T_A$) from the second time period (e.g., $T_B$), as follows:

HTP=$T_B$−$T_A$.

A time (e.g., $T_{HO}$) that the handover of the user device 105 from the first RAN 110-A to the second RAN 110-B may occur is between the first time period (e.g., $T_A$) and the second time period (e.g., $T_B$), as follows:

$T_A$<$T_{HO}$<$T_B$.

In some implementations, the first MEC device 120-A may determine a quality of service (QoS), a signal-to-noise ratio (SNR), a channel capacity, a radio resource allocation requirement, and/or the like of the user device 105. In such implementations, the first MEC device 120-A may determine the handover time period for the user device 105 based on the first time period, the second time period, and one or more of the QoS, the SNR, the channel capacity, the radio resource allocation requirement, and/or the like of the user device 105.

In some implementations, the first MEC device 120-A may cause the user device 105 to be handed over from the first cell region (e.g., the first RAN 110-A) to the second cell region (e.g., the second RAN 110-B) during the handover time period. In some implementations, when causing the user device 105 to be handed over from the first cell region to the second cell region during the handover time period, the first MEC device 120A may cause the first RAN 110-A, associated with the first cell region, to release the user device 105 during the handover time period. The user device 105 may connect with the second RAN 110-B, associated with the second cell region, based on the first RAN 110-A releasing the user device 105. In some implementations, the first MEC device 120-A may set handover priority levels of the user device 105 and other user devices 105 based on a quantity of variables, such as handover time periods of the user devices 105, QoS levels of the user devices 105, resource requirements of the user devices 105, available resources in the second RAN 110-B, CQIs, and/or the like.

Figure 1H:
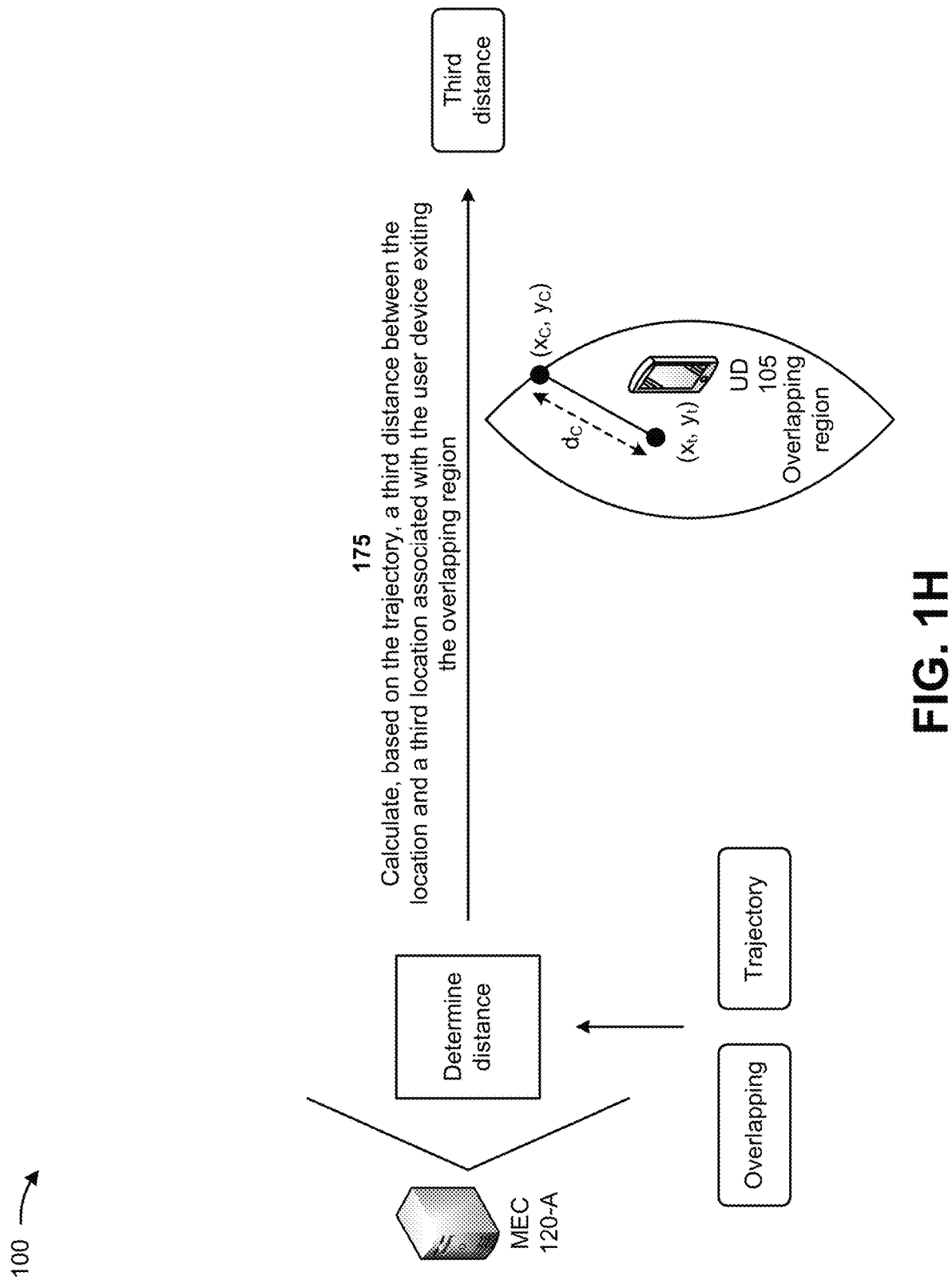

As shown in FIG. 1H, and by reference number 175, the first MEC device 120-A may calculate, based on the trajectory, a third distance between the location and a third location associated with the user device 105 exiting the overlapping region. For example, if the location (e.g., $x_t$, $y_t$) of the user device 105 is within the overlapping region, the trajectory of the user device 105 may indicate that the user device 105 will exit the overlapping region at the third location (e.g., $x_C$, $y_C$). In some implementations, the third location may be the same as the second location (e.g., $x_B$, $y_B$) described above. When the user device 105 is located in the overlapping region, the handover time period may be defined as a time difference between a time when the user device 105 is located at the overlapping region and a time when the user device 105 exits the overlapping region and the first cell region associated with the first RAN 110-A.

In some implementations, the first MEC device 120-A may calculate the third distance (e.g., $d_C$) between the location (e.g., $x_t$, $y_t$) and the third location (e.g., $x_C$, $y_C$) associated with the user device 105 exiting the overlapping region. For example, the first MEC device 120-A may calculate an x-distance between $x_t$ and $x_C$, and may calculate a y-distance between $y_t$ and $y_C$. The first MEC device 120-A may calculate the third distance (e.g., $d_C$) based on the x-distance, the y-distance, and the Pythagorean theorem. At the third location (e.g., $x_C$, $y_C$), the user device 105 may completely lose a signal from the first RAN 110-A and may be completely exiting the first cell region.

Figure 1I:
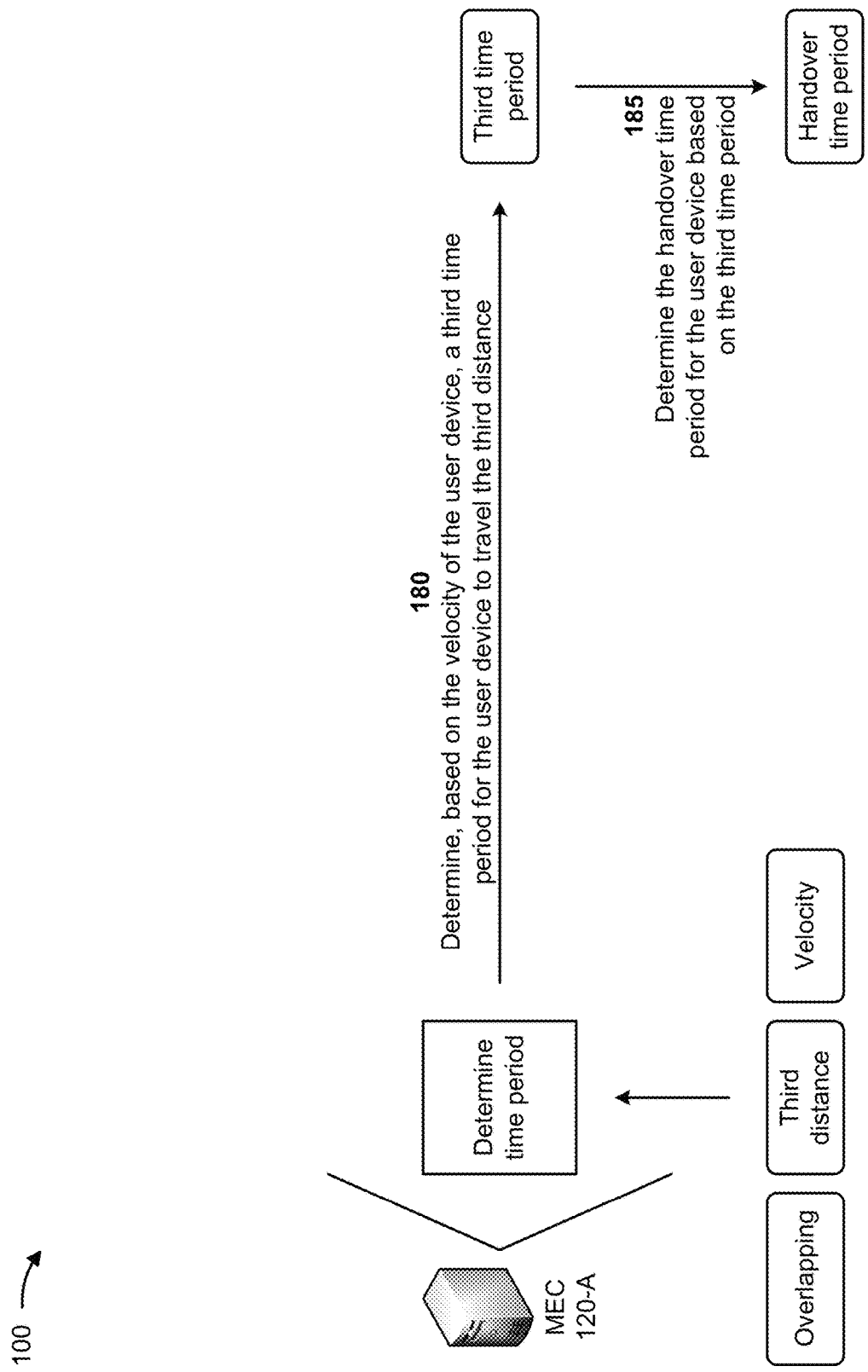

As shown in FIG. 1I, and by reference number 180, the first MEC device 120-A may determine, based on the velocity of the user device 105, a third time period for the user device 105 to travel the third distance. For example, the first MEC device 120-A may determine the third time period (e.g., $T_C$) for the user device 105 to travel the third distance (e.g., $d_C$) by dividing the third distance by the velocity (e.g., v) of the user device 105, as follows:

$$T_C = \frac{d_C}{v}.$$

As further shown in FIG. 1I, and by reference number 185, the first MEC device 120-A may determine the handover time period for the user device 105 based on the third time period. For example, the first MEC device 120-A may determine a handover time period (e.g., HTP) for the user device 105 (e.g., currently in the overlapping region) by subtracting zero from the third time period (e.g., $T_C$), as follows:

HTP=$T_C$−0=$T_C$.

A time (e.g., $T_{HO}$) that the handover of the user device 105 from the first RAN 110-A to the second RAN 110-B may occur is between a present time (e.g., time zero) and the third time period (e.g., $T_C$), as follows:

0<$T_{HO}$<$T_C$.

In some implementations, the first MEC device 120-A may determine a QoS, an SNR, a channel capacity, a radio resource allocation requirement, and/or the like of the user device 105. In such implementations, the first MEC device 120-A may determine the handover time period for the user device 105 based on the third time period and one or more of the QoS, the SNR, the channel capacity, the radio resource allocation requirement, and/or the like of the user device 105. The QoS, the SNR, the channel capacity, the radio resource allocation requirement, and/or the like of the user device 105 may be utilized to determine and/or resolve contentions associated with handover of the user device 105.

Figure 1J:
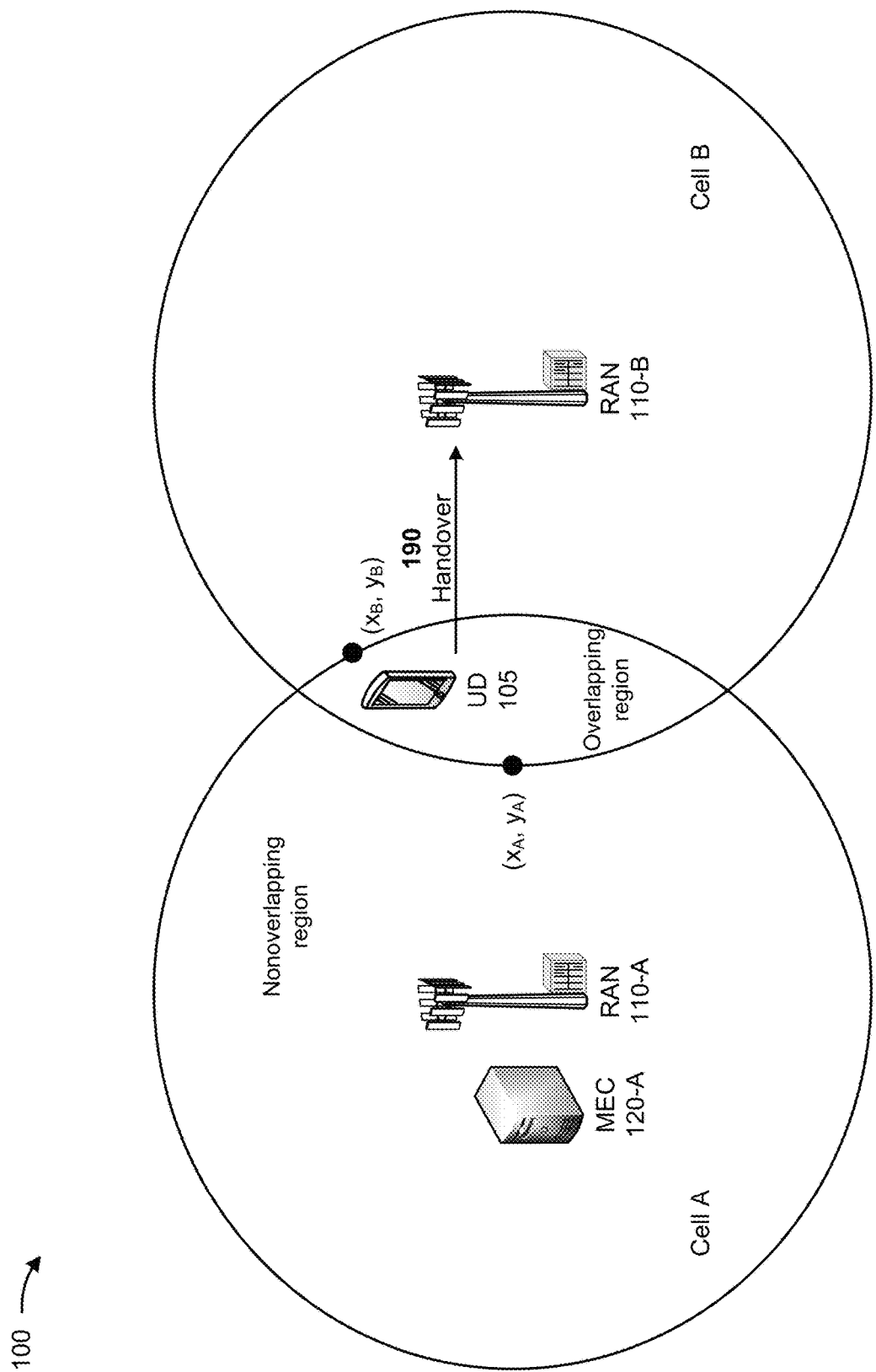

As shown in FIG. 1J, the first MEC device 120-A may cause the user device 105 to be handed over from the first cell region (e.g., the first RAN 110-A) to the second cell region (e.g., the second RAN 110-B) during the handover time period. In some implementations, when causing the user device 105 to be handed over from the first cell region to the second cell region during the handover time period, the first MEC device 120A may cause the first RAN 110-A, associated with the first cell region, to release the user device 105 during the handover time period. The user device 105 may connect with the second RAN 110-B, associated with the second cell region, based on the first RAN 110-A releasing the user device 105. In some implementations, the first MEC device 120-A may set handover priority levels of the user device 105 and other user devices 105 based on a quantity of variables, such as handover time periods of the user devices 105, QoS levels of the user devices 105, resource requirements of the user devices 105, available resources in the second RAN 110-B, CQIs, and/or the like.

Implementations described herein may specify a handover time period that a handover must take place when the user device 105 moves from a serving cell to a neighboring cell. The handover time period may be based on a mobility prediction of the user device 105 by the MEC device 120. In the case of resource-demanding user devices 105, a target RAN 110 may not have enough resources for such resource-demanding user devices 105 when abrupt handovers are executed. With the handover time period, a resource reservation procedure may be triggered ahead of time to ensure the availability of resources when a handover of a resource-demanding user device 105 is eventually executed, thus avoiding service degradation or session disconnection. Such resource-demanding user devices 105 are expected to grow in 5G networks and future generation networks.

The handover time period may mitigate ping-pong effects in radio access networks caused by frequent handovers among two or more cells. The ping-pong effect may occur due to frequent movement of user devices 105 between the cells or due to large signal fluctuations at the overlapping areas of the cells. With the handover time period, a mobile user device 105 may determine a target RAN 110 in advance, and a handover of the user device 105 from a source RAN 110 to a target RAN 110 may occur during the handover time period.

The handover time period may provide network service providers with a powerful tool for handover management since the network service providers may anticipate handovers in advance. Thus, instead of waiting for a signal to drop below a threshold, the network service providers may plan handover management during the handover time period for various enhancements, such as handover based on QoS, handover policing and control when a quantity of expected handovers is large, resource allocation for RANs 110, and/or the like.

In this way, the MEC device 120 determines a handover time period for the user device 105 based on mobility prediction. For example, the MEC device 120 may determine a time period that a handover is to take place when the user device 105 moves from a serving (or source) cell (e.g., the RAN 110-A) to a neighboring (or target) cell (e.g., the RAN 110-B). The MEC device 120 may determine the handover time period based on a mobility prediction of the user device 105 with a machine learning model. Shifting handover time determination to the MEC device 120 helps reduce congestion, decrease latency, and enhance a QoE for end users. Thus, the MEC device 120 may conserve computing resources, networking resources, and/or other resources that would have otherwise been consumed by failing to handover a user device 105 from a source base station (e.g., the RAN 110-A) to a target base station (e.g., the RAN 110-B), providing poor services to a user device 105 handed over to a target base station (e.g., the RAN 110-A) not equipped with sufficient resources to serve the user device 105, losing a connection with a user device 105 due to failing to handover the user device 105 from a source base station (e.g., the RAN 110-A) to a target base station (e.g., the RAN 110-B), and/or the like.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
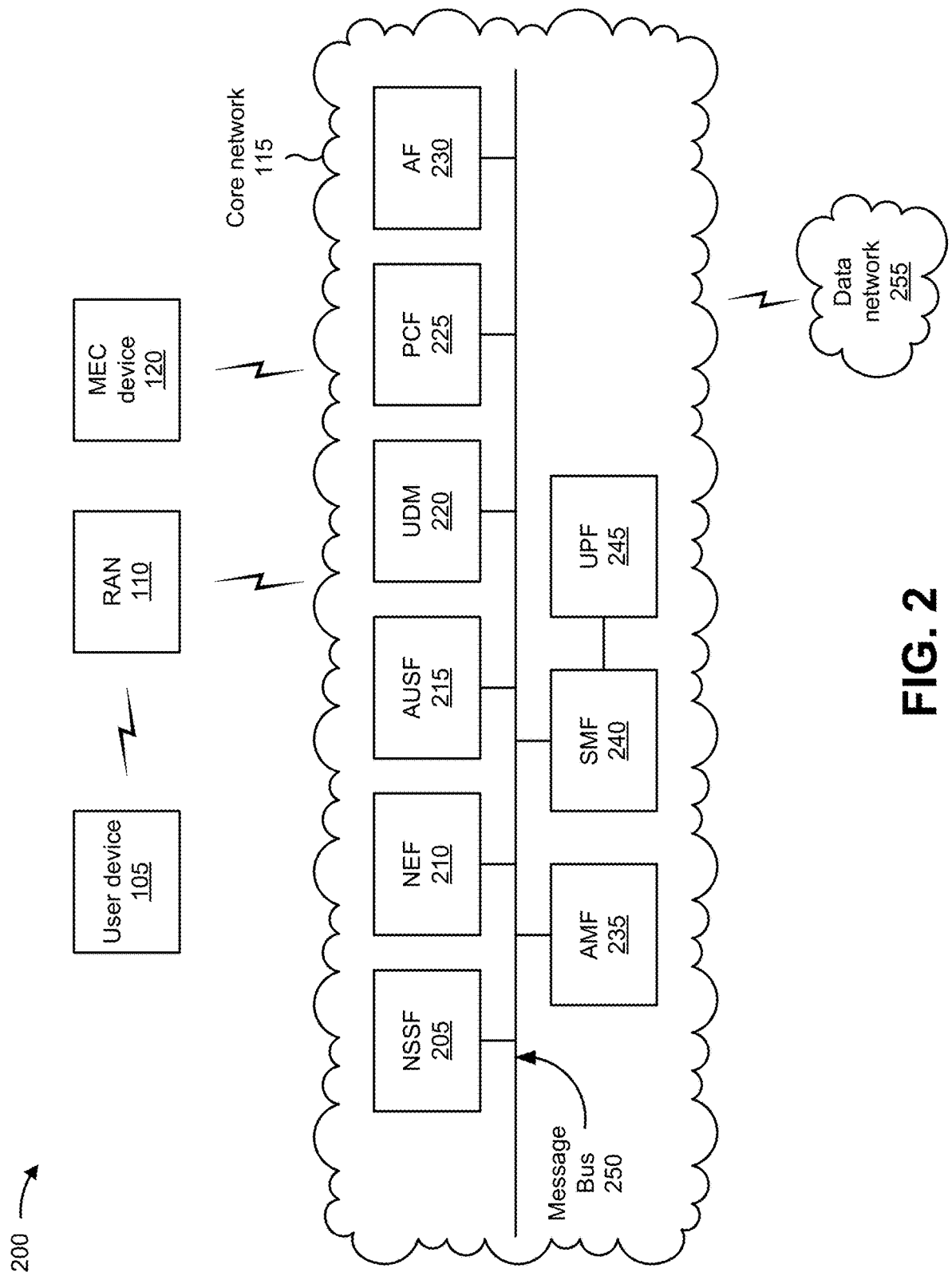
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the user device 105, the RAN 110, the core network 115, the MEC device 120, and a data network 255. Devices and/or networks of the example environment 200 may interconnect via wired connections, wireless connections, or a combination of wired and wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

The MEC device 120 includes one or more devices capable of receiving, generating, storing, processing, providing, and/or routing information, as described elsewhere herein. The MEC device 120 may include a communication device and/or a computing device. For example, the MEC device 120 may include a server, such as an application server, a client server, a web server, a database server, a host server, a proxy server, a virtual server (e.g., executing on computing hardware), or a server in a cloud computing system. In some implementations, the MEC device 120 includes computing hardware used in a cloud computing environment.

As shown in FIG. 2, the core network 115 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, and/or a user plane function (UPF) 245. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the user device 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the user device 105 in the wireless telecommunications system.

The UDM 220 includes one or more devices that store user data and profiles in the wireless telecommunications system. The UDM 220 may be used for fixed access and/or mobile access in the core network 115.

The PCF 225 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 235 includes one or more devices that act as a termination point for non-access stratum (NAS) signaling and/or mobility management, among other examples.

The SMF 240 includes one or more devices that support the establishment, modification, and release of communication sessions in the wireless telecommunications system. For example, the SMF 240 may configure traffic steering policies at the UPF 245 and/or may enforce user equipment IP address allocation and policies, among other examples.

The UPF 245 includes one or more devices that serve as an anchor point for intraRAT and/or interRAT mobility. The UPF 245 may apply rules to packets, such as rules pertaining to packet routing, traffic reporting, and/or handling user plane QoS, among other examples.

The message bus 250 represents a communication structure for communication among the functional elements. In other words, the message bus 250 may permit communication between two or more functional elements.

The data network 255 includes one or more wired and/or wireless data networks. For example, the data network 255 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
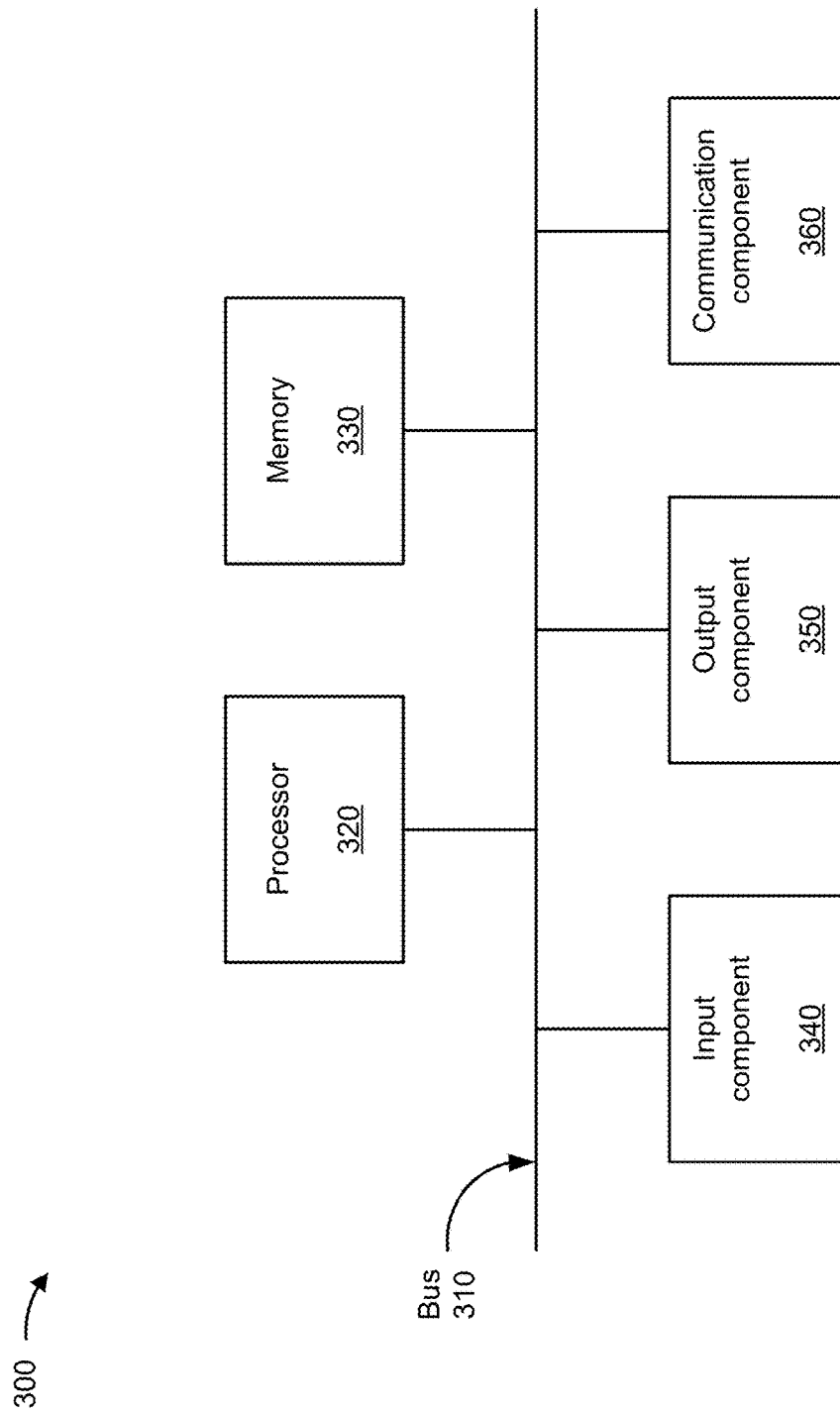
FIG. 3 is a diagram of example components of one or more devices of FIG. 2.

FIG. 3 is a diagram of example components of a device 300, which may correspond to the user device 105, the RAN 110, the MEC device 120, the NSSF 205, the NEF 210, the AUSF 215, the UDM 220, the AF 230, the AMF 235, the SMF 240, and/or the UPF 245. In some implementations, the user device 105, the RAN 110, the MEC device 120, the NSSF 205, the NEF 210, the AUSF 215, the UDM 220, the AF 230, the AMF 235, the SMF 240, and/or the UPF 245, may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
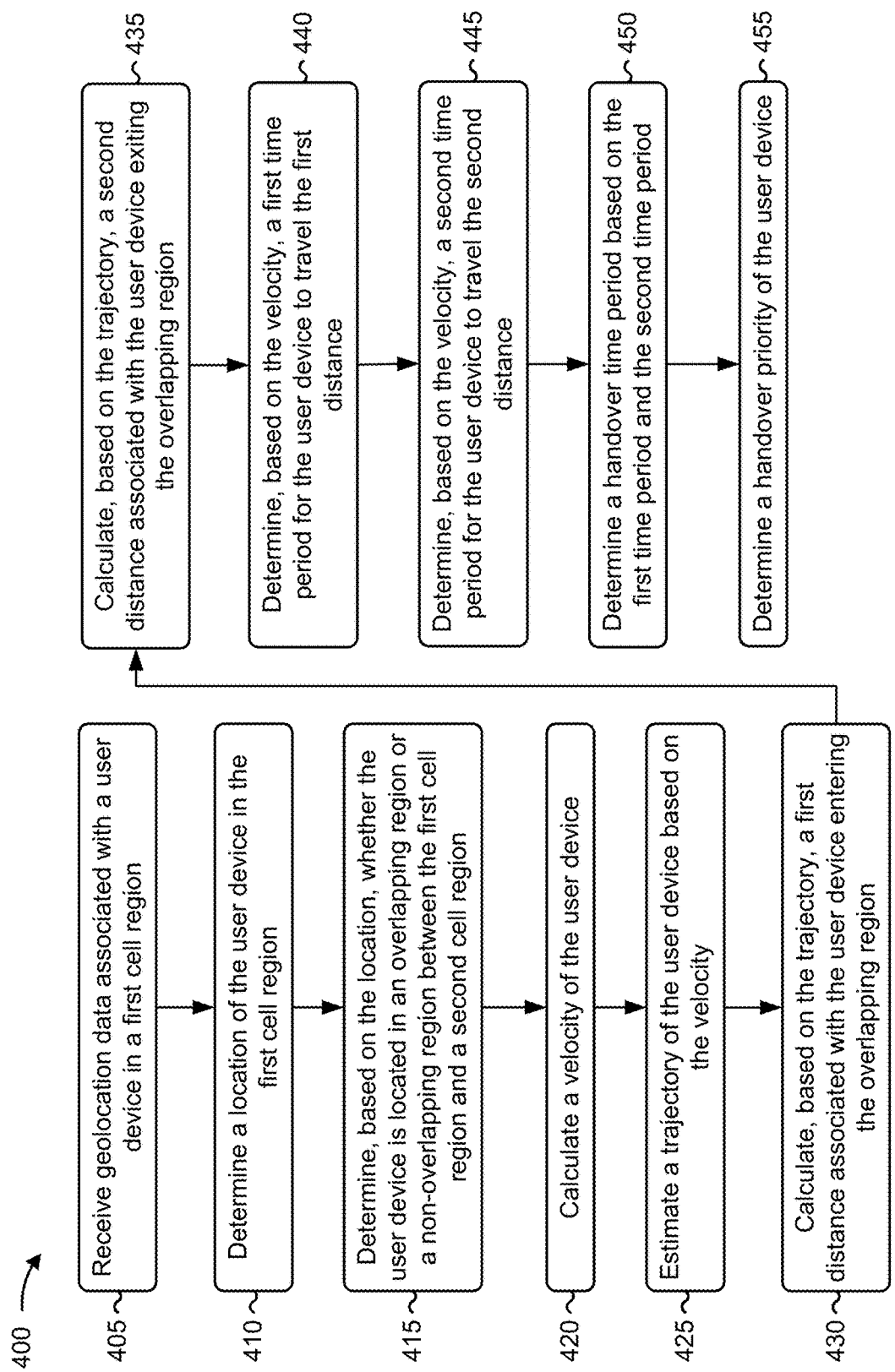
FIG. 4 is a flowchart of an example process for determining a handover time period based on mobility prediction.

FIG. 4 is a flowchart of an example process 400 for determining a handover time period based on mobility prediction. In some implementations, one or more process blocks of FIG. 4 may be performed by a network device (e.g., the MEC device 120). In some implementations, one or more process blocks of FIG. 4 may be performed by another device or a group of devices separate from or including the network device, such as a RAN (e.g., the RAN 110). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving geolocation data associated with a user device in a first cell region (block 405). For example, the network device may receive geolocation data associated with a user device in a first cell region, as described above. In some implementations, the network device is an MEC device co-located with a base station associated with the first cell region.

As further shown in FIG. 4, process 400 may include determining a location of the user device in the first cell region (block 410). For example, the network device may determine, based on the geolocation data, a location of the user device in the first cell region, as described above.

As further shown in FIG. 4, process 400 may include determining, based on the location, whether the user device is located in an overlapping region or a non-overlapping region between the first cell region and a second cell region (block 415). For example, the network device may determine, based on the location, whether the user device is located in an overlapping region between the first cell region and a second cell region or located in a non-overlapping region between the first cell region and the second cell region, as described above. In some implementations, the first cell region is associated with a first base station and the second cell region is associated with a second base station.

As further shown in FIG. 4, process 400 may include calculating a velocity of the user device (block 420). For example, the network device may calculate a velocity of the user device based on the geolocation data, as described above. In some implementations, calculating the velocity of the user device based on the geolocation data includes processing the geolocation data, with a machine learning model, to calculate the velocity of the user device.

As further shown in FIG. 4, process 400 may include estimating a trajectory of the user device based on the velocity (block 425). For example, the network device may estimate a trajectory of the user device based on the velocity of the user device, as described above.

As further shown in FIG. 4, process 400 may include calculating, based on the trajectory, a first distance associated with the user device entering the overlapping region (block 430). For example, the network device may calculate, based on the user device being located in the non-overlapping region and based on the trajectory, a first distance between the location and a first location associated with the user device entering the overlapping region, as described above.

As further shown in FIG. 4, process 400 may include calculating, based on the trajectory, a second distance associated with the user device exiting the overlapping region (block 435). For example, the network device may calculate, based on the user device being located in the non-overlapping region and based on the trajectory, a second distance between the location and a second location associated with the user device exiting the overlapping region, as described above.

As further shown in FIG. 4, process 400 may include determining, based on the velocity, a first time period for the user device to travel the first distance (block 440). For example, the network device may determine, based on the velocity of the user device, a first time period for the user device to travel the first distance, as described above. In some implementations, determining the first time period for the user device to travel the first distance includes dividing the first distance by the velocity of the user device to determine the first time period.

As further shown in FIG. 4, process 400 may include determining, based on the velocity, a second time period for the user device to travel the second distance (block 445). For example, the network device may determine, based on the velocity of the user device, a second time period for the user device to travel the second distance, as described above. In some implementations, determining the first time period for the user device to travel the first distance and the second time period for the user device to travel the second distance includes dividing the first distance by the velocity of the user device to determine the first time period, and dividing the second distance by the velocity of the user device to determine the second time period.

As further shown in FIG. 4, process 400 may include determining a handover time period based on the first time period and the second time period (block 450). For example, the network device may determine a handover time period for the user device based on the first time period and the second time period, as described above. In some implementations, the handover time period is between the first time period and the second time period.

As further shown in FIG. 4, process 400 may include determining a handover priority level of the user device (block 455). For example, the network device may determine a handover priority level of the user device based on one or more of handover time periods of other user devices, a quality of service of the user device, a resource requirement of the user device, available resources in the second cell region, or a channel quality indicator of the user device, as described above.

In some implementations, process 400 includes causing the user device to be handed over from the first cell region to the second cell region during the handover time period and based on the handover priority level. In some implementations, causing the user device to be handed over from the first cell region to the second cell region during the handover time period includes causing a first base station, generating the first cell region, to release the user device during the handover time period, where the user device connects with a second base station, generating the second cell region, based on the first base station releasing the user device.

In some implementations, process 400 includes calculating, based on the user device being located in the overlapping region and based on the trajectory, a third distance between the location and a third location associated with the user device exiting the overlapping region; determining, based on the velocity of the user device, a third time period for the user device to travel the third distance; and determining the handover time period for the user device based on the third time period. In some implementations, the handover time period is less than the third time period. In some implementations, determining the third time period for the user device to travel the third distance includes dividing the third distance by the velocity of the user device to determine the third time period.

In some implementations, process 400 includes determining one or more of a QoS, an SNR, a channel capacity, or a radio resource allocation requirement of the user device, and determining the handover time period for the user device based on the first time period, the second time period, and the one or more of the QoS, the SNR, the channel capacity, or the radio resource allocation requirement of the user device.

In some implementations, process 400 includes identifying a base station generating the second cell region based on the trajectory of the user device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device associated with a first cell region, geolocation data associated with a user device in the first cell region;
   determining, by the network device and based on the geolocation data, a location of the user device in the first cell region;
   determining, by the network device and based on the location, whether the user device is located in an overlapping region between the first cell region and a second cell region or located in a non-overlapping region between the first cell region and the second cell region;
   calculating, by the network device, a velocity of the user device based on the geolocation data;
   estimating, by the network device, a trajectory of the user device based on the velocity of the user device;
   calculating, by the network device, based on the user device being located in the non-overlapping region, and based on the trajectory, a first distance between the location and a first location associated with the user device entering the overlapping region;
   calculating, by the network device, based on the user device being located in the non-overlapping region, and based on the trajectory, a second distance between the location and a second location associated with the user device exiting the overlapping region;
   determining, by the network device and based on the velocity of the user device, a first time period for the user device to travel the first distance;
   determining, by the network device and based on the velocity of the user device, a second time period for the user device to travel the second distance;
   determining, by the network device, a handover time period for the user device based on the first time period and the second time period; and
   determining, by the network device, a handover priority level of the user device based on handover time periods of other user devices, and based on one or more of a quality of service of the user device, a resource requirement of the user device, available resources in the second cell region, or a channel quality indicator of the user device.

2. The method of claim 1, further comprising:
   causing the user device to be handed over from the first cell region to the second cell region during the handover time period and based on the handover priority level.

3. The method of claim 1, further comprising:
   calculating, based on the user device being located in the overlapping region and based on the trajectory, a third distance between the location and a third location associated with the user device exiting the overlapping region;
   determining, based on the velocity of the user device, a third time period for the user device to travel the third distance; and
   determining the handover time period for the user device based on the third time period.

4. The method of claim 3, wherein determining the third time period for the user device to travel the third distance comprises:
   dividing the third distance by the velocity of the user device to determine the third time period.

5. The method of claim 1, wherein the handover time period is between the first time period and the second time period.

6. The method of claim 1, wherein calculating the velocity of the user device based on the geolocation data comprises:
   processing the geolocation data, with a machine learning model, to calculate the velocity of the user device.

7. The method of claim 1, wherein determining the first time period for the user device to travel the first distance comprises:
   dividing the first distance by the velocity of the user device to determine the first time period.

8. A network device, comprising:
   one or more processors configured to:
      receive geolocation data associated with a user device in a first cell region;
      determine, based on the geolocation data, a location of the user device in the first cell region;
      determine, based on the location, whether the user device is located in an overlapping region between the first cell region and a second cell region or located in a non-overlapping region between the first cell region and the second cell region;
      calculate a velocity of the user device based on the geolocation data;
      estimate a trajectory of the user device based on the velocity of the user device;
      calculate, based on the user device being located in the non-overlapping region and based on the trajectory, a first distance between the location and a first location associated with the user device entering the overlapping region and a second distance between the location and a second location associated with the user device exiting the overlapping region;

determine, based on the velocity of the user device, a first time period for the user device to travel the first distance and a second time period for the user device to travel the second distance;

determine a handover time period for the user device based on the first time period and the second time period;

determine a handover priority level of the user device based on handover time periods of other user devices; and cause, based on the handover priority level, the user device to be handed over from the first cell region to the second cell region during the handover time period for the user device.

9. The network device of claim 8, wherein the one or more processors, to determine the first time period for the user device to travel the first distance and the second time period for the user device to travel the second distance, are configured to:

divide the first distance by the velocity of the user device to determine the first time period; and divide the second distance by the velocity of the user device to determine the second time period.

10. The network device of claim 8, wherein the one or more processors are further configured to:

determine one or more of a quality of service (QOS), a signal-to-noise ratio (SNR), a channel capacity, or a radio resource allocation requirement of the user device; and determine the handover time period for the user device based on the first time period, the second time period, and the one or more of the QoS, the SNR, the channel capacity, or the radio resource allocation requirement of the user device.

11. The network device of claim 8, wherein the network device is a multi-access edge computing device co-located with a base station associated with the first cell region.

12. The network device of claim 8, wherein the first cell region is associated with a first base station and the second cell region is associated with a second base station.

13. The network device of claim 8, wherein the one or more processors, to cause the user device to be handed over from the first cell region to the second cell region during the handover time period for the user device, are configured to:

cause a first base station, generating the first cell region, to release the user device during the handover time period for the user device, wherein the user device connects with a second base station, generating the second cell region, based on the first base station releasing the user device.

14. The network device of claim 8, wherein the one or more processors are further configured to:

identify a base station generating the second cell region based on the trajectory of the user device.

15. A non-transitory computer-readable medium storing a set of instructions, the set of instructions comprising:

one or more instructions that, when executed by one or more processors of a network device, cause the network device to:

receive geolocation data associated with a user device in a first cell region;

determine, based on the geolocation data, a location of the user device in the first cell region;

determine, based on the location, whether the user device is located in an overlapping region between the first cell region and a second cell region or located in a non-overlapping region between the first cell region and the second cell region;

calculate a velocity of the user device based on the geolocation data;

estimate a trajectory of the user device based on the velocity of the user device;

calculate, based on the user device being located in the non-overlapping region and based on the trajectory, a first distance between the location and a first location associated with the user device entering the overlapping region;

calculate, based on the user device being located in the non-overlapping region and based on the trajectory, a second distance between the location and a second location associated with the user device exiting the overlapping region;

determine, based on the velocity of the user device, a first time period for the user device to travel the first distance;

determine, based on the velocity of the user device, a second time period for the user device to travel the second distance;

determine one or more of a quality of service (QOS), a signal-to-noise ratio (SNR), a channel capacity, or a radio resource allocation requirement of the user device;

determine a handover time period for the user device based on the first time period, the second time period, and the one or more of the QoS, the SNR, the channel capacity, or the radio resource allocation requirement of the user device;

determine a handover priority level of the user device based on the QoS of the user device; and cause, based on the handover priority level, the user device to be handed over from the first cell region to the second cell region during the handover time period.

16. The non-transitory computer-readable medium of claim 15, wherein the one or more instructions further cause the network device to:

calculate, based on the user device being located in the overlapping region and based on the trajectory, a third distance between the location and a third location associated with the user device exiting the overlapping region;

determine, based on the velocity of the user device, a third time period for the user device to travel the third distance; and determine the handover time period for the user device based on the third time period.

17. The non-transitory computer-readable medium of claim 16, wherein the handover time period is less than the third time period.

18. The non-transitory computer-readable medium of claim 15, wherein the handover time period is between the first time period and the second time period.

19. The non-transitory computer-readable medium of claim 15, wherein the one or more instructions, that cause the network device to calculate the velocity of the user device based on the geolocation data, cause the network device to:

process the geolocation data, with a machine learning model, to calculate the velocity of the user device.

20. The non-transitory computer-readable medium of claim 15, wherein the one or more instructions, that cause the network device to determine the first time period for the user device to travel the first distance, cause the network device to:
  divide the first distance by the velocity of the user device to determine the first time period.

* * * * *